UNITED STATES PATENT OFFICE.

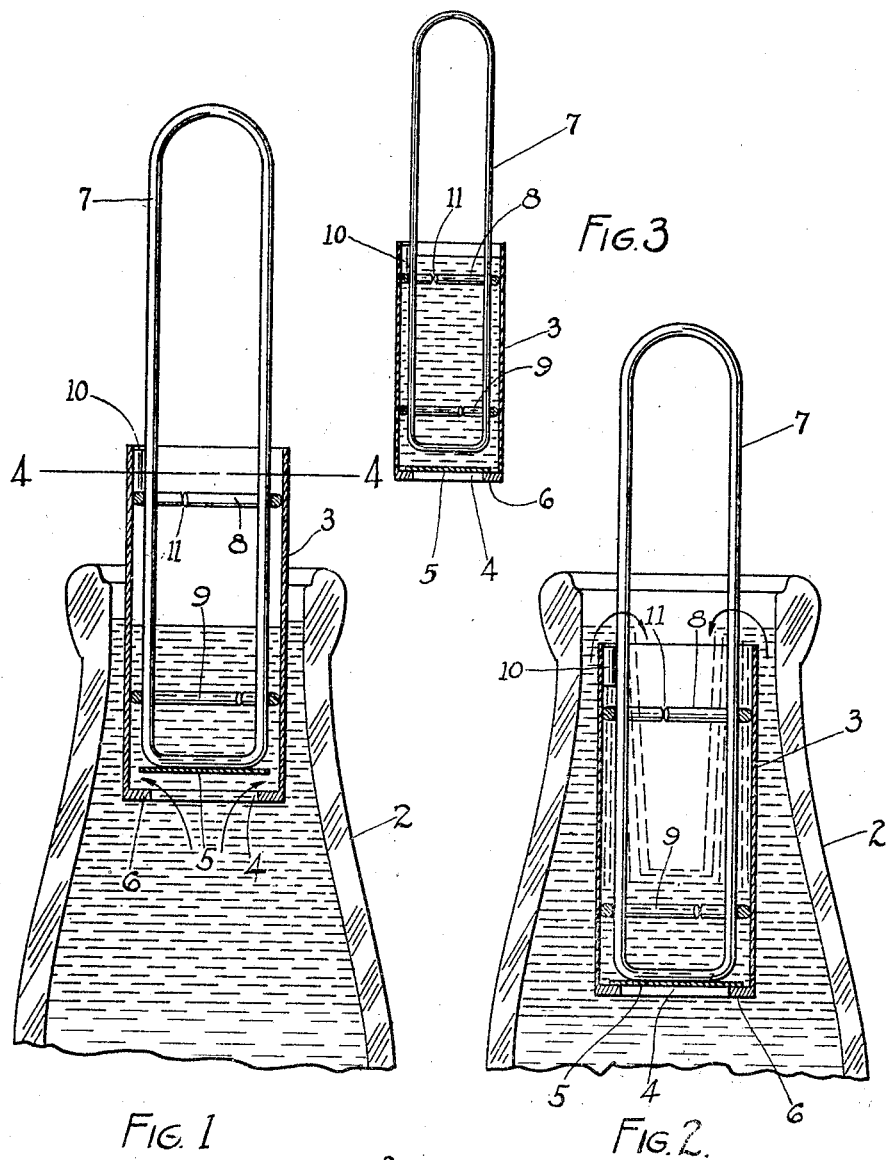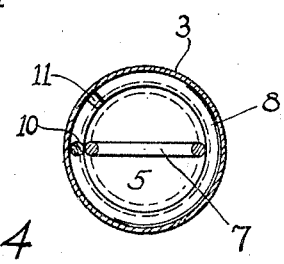

FREDERIC WOMMER, OF MINNEAPOLIS, MINNESOTA.

CREAM-EXTRACTOR.

1,377,650.   Specification of Letters Patent.   Patented May 10, 1921.

Application filed March 17, 1920. Serial No. 366,508.

*To all whom it may concern:*

Be it known that I, FREDERIC WOMMER, a citizen of the United States, resident of Minneapolis, county of Hennepin, State of Minnesota, have invented certain new and useful Improvements in Cream-Extractors, of which the following is a specification.

The object of my invention is to provide a device by means of which the accumulation of cream in the top of a milk bottle or similar receptacle may be easily and quickly removed without waste of the cream and without mixing it with the milk.

The invention consists generally in various constructions and combinations, all as hereinafter described and particularly pointed out in the claims.

In the accompanying drawings forming part of this specification,

Figure 1 is a detail sectional view of the upper portion of a milk bottle showing my cream extractor inserted therein for the initial removal of the cream, Fig. 2 is a similar view, showing the final step in the removal of the cream, Fig. 3 is a detail sectional view of the device removed from the bottle, Fig. 4 is a transverse sectional view on the line 4—4 of Fig. 1, In the drawing, 2 represents the upper portion of a milk bottle, having the usual flaring walls and the open top. 3 is a cup, preferably in the form of a cylinder, composed of suitable material, such as sheet metal, and having a port 4 in its lower end that is normally closed by a gravity valve 5. This valve preferably consists of a disk of metal loosely fitting in the bottom of the cup and resting on a ring 6 which encircles the port or opening 4. Normally this valve will close the port by gravity. The cup has an open top and fitting therein is a loop 7 of suitable material, preferably wire, the upper portion of the loop forming a hand grip and the lower portion fitting within the cup and supporting ring-like members 8 and 9, preferably of spring material, which slide on the inner walls of the cup and are guided thereby. A stop 10 is provided on the inner walls of the cup near its open end for limiting the upward movement of the rings and the loop therein, but each ring may be provided with a gap 11 to receive the stop 10 and allow the loop and rings to be withdrawn from the cup when the loop is rotated to a point where the gaps 11 will register with the stop. I prefer, however, in practice to mount the loop and rings so that they can not be withdrawn from the cup. Normally, the inner end of the loop is near the bottom of the cup and forms a stop to limit the inward movement of the valve disk 5.

In the position shown in Figs. 1 and 3, the valve is free to open under pressure of the cream to allow the cup to fill with cream and when it is so filled and the cup is lifted, the valve will close and prevent the cream from flowing out through the port when the cup is removed from the bottle. The rings 8 and 9 have sufficient frictional contact with the walls of the cup to hold them in the position shown in Figs. 1 and 3 and, when desired, the operator can push the loop 7 and the rings inward until the inner end of the loop contacts with the valve, as shown in Fig. 2, and thereupon the valve will be locked in its closed position. This is done after the initial operation of allowing cream to flow from the top of the bottle through the port in the cup, and when the cream so collected is discharged from the cup, the operator will push the loop to the position shown in Fig. 2, locking the valve and closing the port. Then upon reinserting the cup into the bottle the cream and milk will be prevented from entering the cup through the bottom, but as the cup is thrust down into the bottle the cream remaining on the surface of the milk after the first removal will flow over the top of the cup and through the opening therein, as indicated in Fig. 2, and this flow may continue until all of the cream that has accumulated on the surface of the milk has been gathered up. This second operation of the cup is usually necessary, as the flaring walls of the bottle allow a portion of the cream to accumulate at a point near these walls where it will not be gathered up on the initial insertion of the cup into the bottle, but when the bottom of the cup is closed and the device is thrust into the bottle a second time, this cream will rise between the walls of the bottle and the cup and flowing over the edge of the cup can be easily and quickly collected, the user, of course, viewing the flow of the cream through the transparent walls of the bottle.

I claim as my invention:

1. A device of the class described comprising a cup having an open top and a port in its lower walls and a valve normally closing said port, means fitting within said cup and having frictional engagement with the walls thereof and mounted for longitudinal movement, said means projecting above said cup to form a hand grip and having its lower end above said valve and contacting therewith when forced downwardly to close and hold said valve in its closed position, said means, when moved upwardly, becoming disengaged from said valve and allowing it to raise and open said port.

2. A device of the class described comprising a cup having an open top and a port in its lower walls and a valve comprising a flat disk, normally closing said port, means in the form of an elongated, U-shaped loop fitting within said cup and having means for frictional engagement with the inner walls thereof, said means projecting above said cup and forming a hand grip, and its lower end contacting with the upper surface of said valve for forcing it downwardly to close said port, said means when moved upwardly in said cup, releasing said valve and allowing it to rise and open said port.

3. A device of the class described comprising a cup having an open top and a bottom provided with a port and a disk valve normally closing said port by gravity, a slide mounted in said cup and having means for contact with the walls thereof for holding said slide in its adjusted positions, downward movement of said slide engaging its lower end with said disk and forcing said disks to the bottom of said cup and closing said port, upward movement of said slide separating it from said valve and allowing said valve to rise under pressure of the liquid and open said port, and said cup having a stop for limiting the outward movement of said slide therein.

4. A device of the class described comprising a cup having an open top and a port in its lower walls and a valve normally closing said port, a loop fitting within said cup and rings carried by said loop and having frictional engagement with the walls of said cup and mounted for longitudinal movement therein, said loop in its normal position limiting the movement of said valve and when thrust farther into the cup with said rings engaging said valve and locking it in its closed position.

In witness whereof, I have hereunto set my hand this 12" day of March, 1920.

FREDERIC WOMMER.